US005224218A

United States Patent [19]

Shiga

[11] Patent Number: 5,224,218

[45] Date of Patent: Jun. 29, 1993

[54] MICROWAVE DEVICE

[75] Inventor: Nobuo Shiga, Yokohama, Japan

[73] Assignee: Sumitomo Electric Industries, Ltd., Japan

[21] Appl. No.: 686,946

[22] Filed: Apr. 18, 1991

[30] Foreign Application Priority Data

Apr. 19, 1990 [JP] Japan .................................... 2103408

[51] Int. Cl.[5] ............................................ H04B 1/26

[52] U.S. Cl. .................................... 455/323; 455/327; 330/286; 330/307

[58] Field of Search ............... 455/323, 325, 327, 328; 357/22 H; 333/246, 247; 330/286, 307, 277

[56] References Cited

U.S. PATENT DOCUMENTS 4,494,083 1/1985 Josefsson et al. ................... 333/246
4,679,249 7/1987 Tanaka et al. ...................... 455/328
5,021,866 6/1991 Sudo et al. ......................... 333/247

FOREIGN PATENT DOCUMENTS 0106208 6/1985 Japan .................................. 455/327

*Primary Examiner*—Reinhard J. Eisenzopf
*Assistant Examiner*—Timothy H. Keough
*Attorney, Agent, or Firm*—Beveridge, DeGrandi, Weilacher

[57] ABSTRACT

There is disclosed a microwave device including a substrate made of a dielectric material, and a frequency conversion circuit formed on a front surface there of the circuit, has a microstrip line and a radio frequency amplifier. The substrate is partially thinned at a portion of its back surface which faces the radio frequency amplifier.

5 Claims, 4 Drawing Sheets

MICROWAVE DEVICE

BACKGROUND OF THE INVENTION

1. Field of the Invention

The present invention relates to a microwave device for a low noise amplifier used in a receiver of a satellite communication system or the like.

2. Related Background Art

A microwave device having a frequency converter is primarily classified to a down-converter and an up-converter. The down-converter has a function to mix a local oscillator output to a microwave to take out and detect a signal component of a lower frequency. On the other hand, the up-converter has a function to mix the local oscillator output to a low frequency signal power to take out and detect a microwave signal component.

Those converters are frequently used as circuits to correct a signal waveform at a relay station and reduce noise when information is transmitted by using the microwave as a carrier.

A microstrip line having a metal thin film deposited on a dielectric material is frequently used in the microwave device. A general structure of the microstrip line is shown in FIG. 1 in which a conductive layer 31 is arranged on a rear surface of a dielectric material 32 having a thickness 41, and a strip conductor 33 having a width 42 is arranged on a front surface of the dielectric material 32, to form a microstrip line.

In such a microwave device, there is a demand to reduce the thickness of the dielectric material 32. By doing so, the following advantages are offered.

First, since the width of the strip conductor 33 may be narrower, the size of the chip may be reduced. Since a characteristic impedance of the microstrip line is represented by a ratio of the width 42 of the strip conductor 33 and the thickness 41 of the dielectric material 32, the strip conductor 33 may be narrower without changing the characteristic impedance if the dielectric material 32 is thinned.

In the microwave device, the transmission line on the microwave device and the strip line must be long in view of the requirement for the wavelength to be processed. Accordingly, the reduction of the width of the strip conductor greatly contributes to the reduction of the chip size of the microwave device.

Secondly, as the dielectric material 32 is thinned, a via-hole which connects the conductive layer 31 and the strip line 33 is shallow and a transmission loss therebetween is reduced. Accordingly, a low noise property is improved.

Since an RF amplifier of the down-converter requires the low noise property, the improvement by thinning the dielectric material is remarkable.

The RF amplifier in the microwave device chip has a plurality of stages of transistors and source terminals thereof that are connected with the conductor on the rear side of the microwave device chip through via holes. Accordingly, the low noise property of the RF amplifier is improved by reducing the transmission loss of the via holes for the connection.

Thirdly, the variations of shapes and dimensions of the via-holes are reduced and the variation of the performance of the microwave device is improved.

Thus, the thinning of the dielectric material 32 is important in improving the performance of the microwave device.

On the other hand, the following problems are newly raised when the dielectric material is thinned.

First, a yield in a thinning process of the dielectric material (substrate) 32 is lowered.

Secondly, since the semiconductor which uses the dielectric material as the substrate is difficult to handle, a yield in a process after the dielectric material has been thinned is lowered.

Thirdly, a transmission loss increases.

As described above, the performance of the microwave device may be improved by thinning the dielectric material 32 but the thickness of the dielectric material 32 cannot be substantially reduced because of the problems described above.

SUMMARY OF THE INVENTION

It is, therefore, an object of the present invention to solve those problems and improve the performance of the microwave device by thinning the dielectric material.

It is an another object of the present invention to provide a microwave device comprising a substrate made of a dielectric material and a frequency conversion circuit formed on a front surface of said substrate and having a microstrip line and radio frequency amplifier, the substrate being partially thinned in a portion of a back surface thereof facing the radio frequency.

It is a further object of the present invention to provide a microwave device comprising a substrate made of a dielectric material and having a conductive layer for a microstrip line on a back surface thereof and a frequency conversion circuit formed on a front surface of the substrate and having a microstrip line and a radio frequency amplifier, a portion of the radio frequency amplifier being electrically connected to the conductive layer through a through hole formed in said substrate and the substrate being partially thinned in a portion of the back surface thereof corresponding to said though hole.

It is further object of the present invention to provide a microwave device comprising a substrate made of a dielectric material and a frequency conversion circuit formed on a front surface of said substrate and having a microstrip line and a radio frequency amplifier, the substrate being partially thinned in a portion of a back surface there facing the microstrip line.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENT

One embodiment of the present invention is now explained with reference to FIGS. 2A to 3B.

Figure 1:
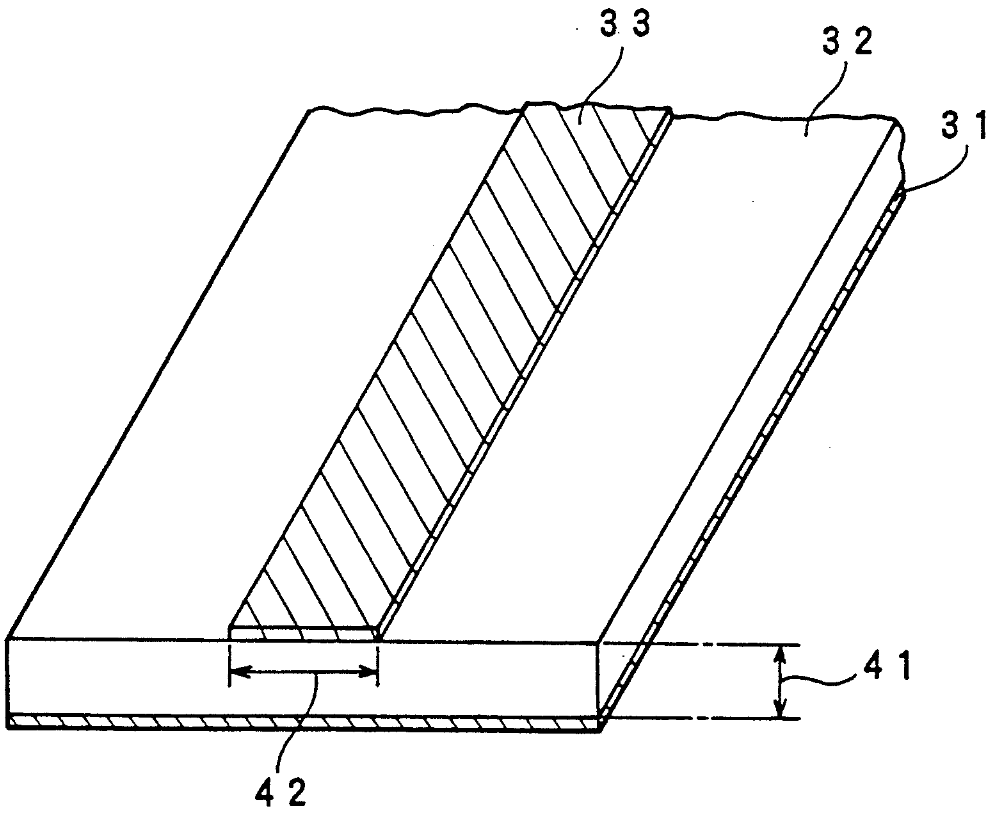
Fig. 1 (PRIOR ART)
FIG. 1 shows a perspective view of a conventional microstrip line in the prior art.
Figure 2A:
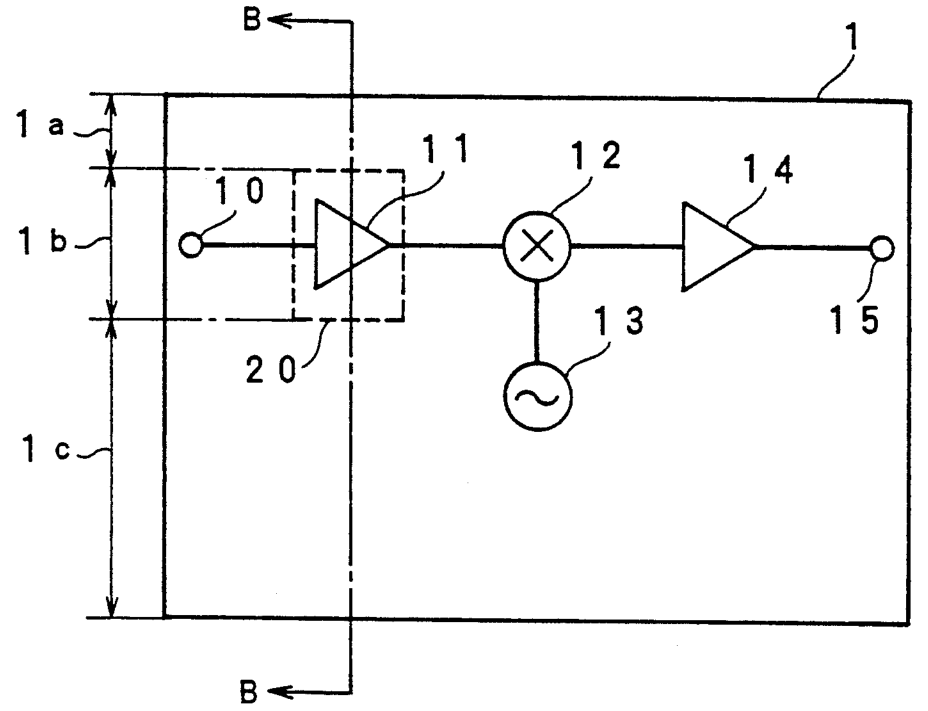
FIG. 2A shows a plan view of a down-converter in one embodiment of the present invention.
Figure 2B:
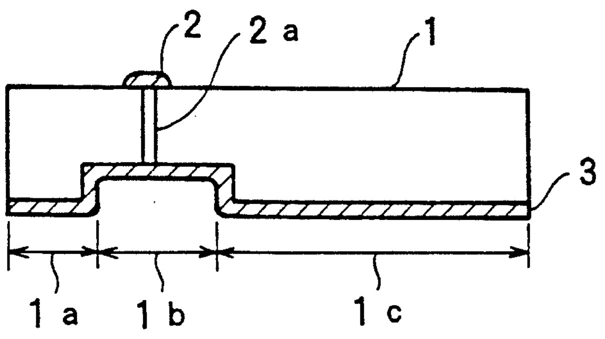
FIG. 2B shows a sectional view taken along a line B—B in FIG. 2A.

FIG. 2A shows a plan view of a down-converter in the embodiment, and FIG. 2B shows a sectional view taken along a line B—B of FIG. 2A. In FIG. 2A, an RF (radio frequency) amplifier 11, a receiver mixer 12, an oscillator 13 and an IF (intermediate frequency) amplifier 14 are formed on a GaAs substrate 1.

An operation of the down-converter is described below. A microwave in an RF frequency band having a frequency of 10 to 18 GHz is applied to an input terminal 10, and a signal amplified by the RF amplifier 11 is mixed with an output of the oscillator 13 by the receiver mixer 12 so that it is converted to an intermediate frequency signal of 1 to 2 GHz, which is amplified by the IF amplifier 14 and outputted at an output terminal 15.

In the present embodiment, the GaAs substrate 1 is used as a dielectric material.

Figure 3A:
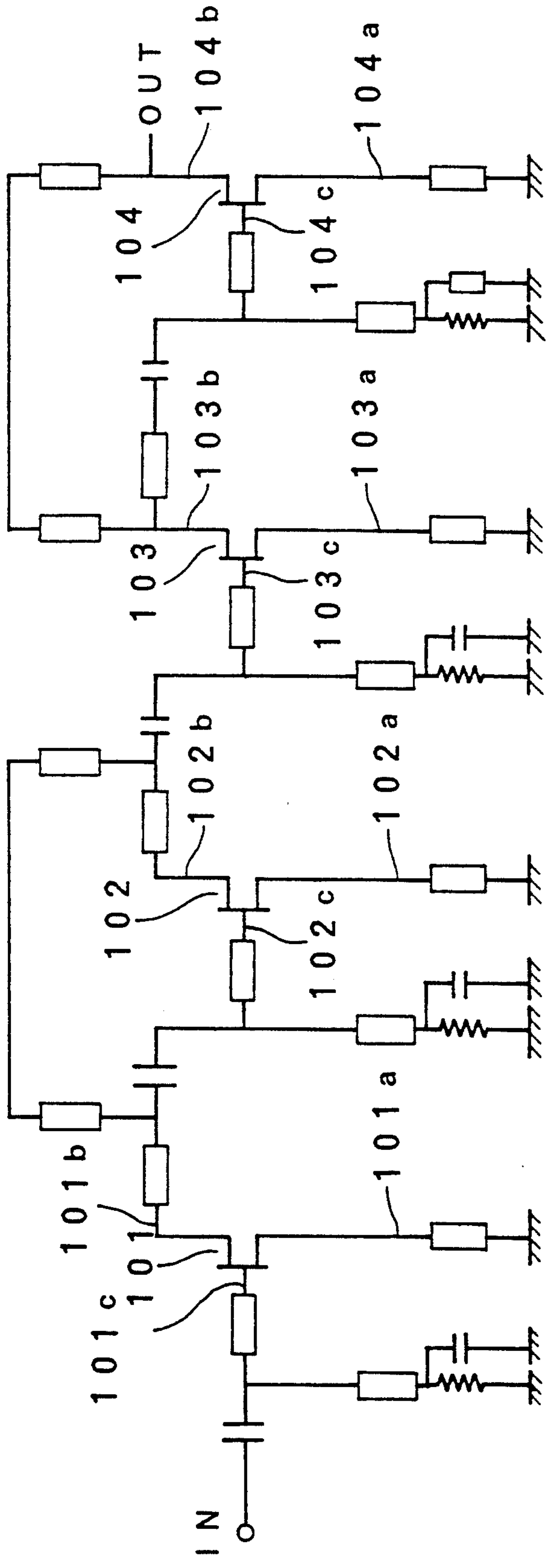
FIG. 3A shows a circuit diagram of an RF amplifier shown in FIG. 2A.

As shown in FIG. 3A, the RF amplifier 11 of the down-converter comprises four stages of FETs(field effect Transistor) 101, 102, 103 and 104, and source terminals 101*a*, 102*a*, 103*a* and 104*a* of the FET 101, 102, 103 and 104, which are corresponding to a pattern 2 (FIG. 2B), respectively, and which are grounded through a conductive pattern 3 (FIG. 2B) formed on the rear surface of the GaAs substrate 1. The source terminals 101*a*, 102*a*, 103*a* and 104*a* are electrically connected to the conductive pattern 3 (FIG. 2B) through via holes 2*a* (FIG. 2B) formed in the GaAs substrate 1.

Figure 3B:
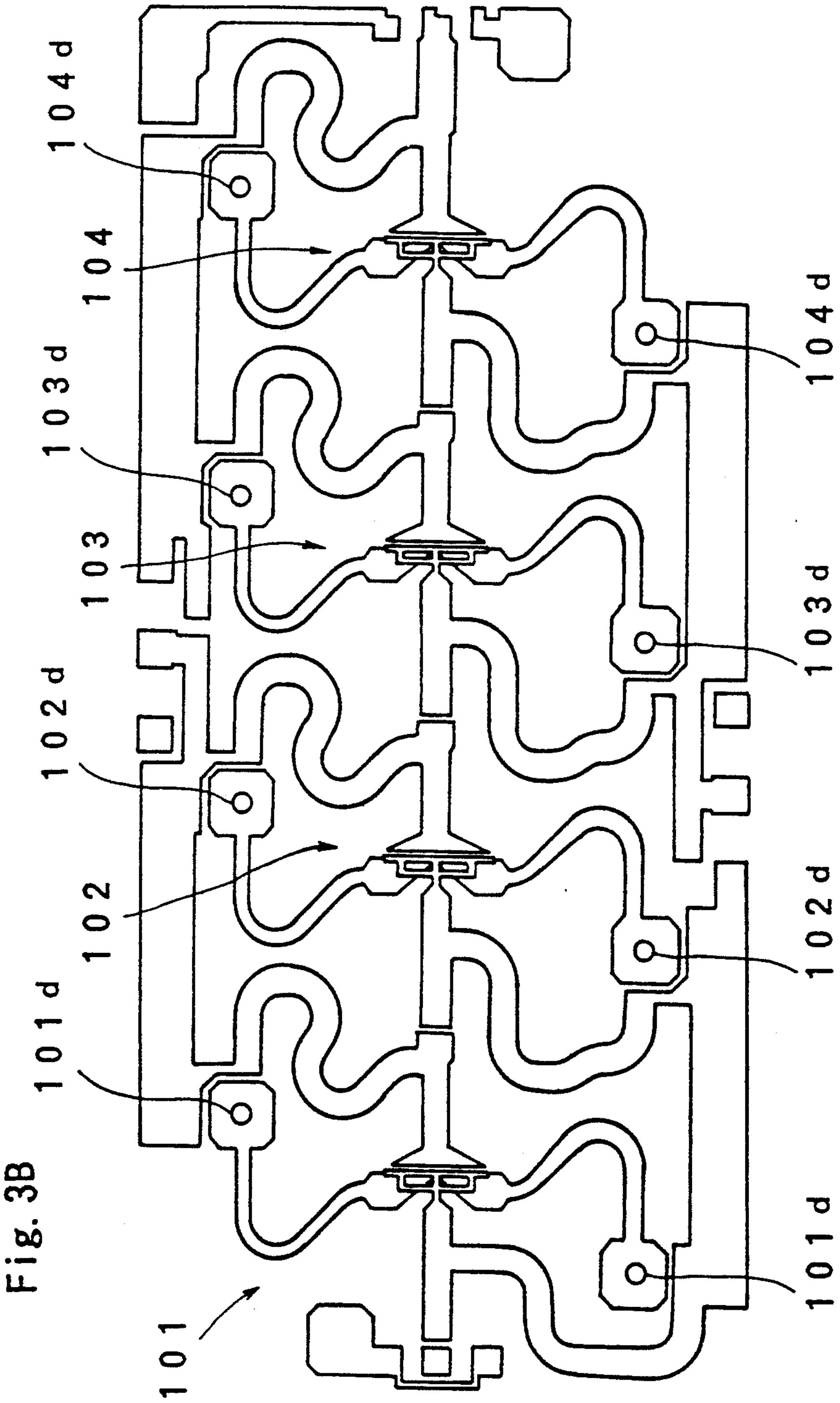
FIG. 3B shows a general view of a circuit pattern of the RF amplifier on a chip.

Further, drain terminals 101*b* and 102*b* of the FETs 101 and 102 are connected together and a power supply not shown. Drain Terminals 103*b* and 104*b* of the FETs 103 and 104 are connected together to a power supply (not shown). The drain terminals 101*b*, 102*b*, 103*b* and 104*b* are also respectively connected to gate terminals 101*c*, 102*c*, 103*c* and 104*c* of the next stage FET through capacitors. Gate terminals of the transistors 101, 102, 103 and 104 are grounded through load elements. A top view of a circuit pattern of the RF amplifier 11 formed the microwave device chip is shown in FIG. 3B. As shown therein, the source terminals are connected to the conductive patter 3 (FIG. 2B) formed on the rear surface of the GaAs substrate 1 through the via holes 101*d*, 102*d*, 103*d* and 104*d* (FIG. 3B).

As described above, it is desirable that the GaAs substrate 1 is an thin as possible in order to minimize the chip size and improve the low noise characteristic.

However, a minimum thickness of 400 μm is required in order to impart a mechanical strength durable to the machining in various steps such as etching and electrode metal vapor deposition. In the present embodiment, the manufacturing is done with the thickness of 400 μm, and the thickness is reduced to approximately 150 μm, a yield in the thinning process is lowered and a yield in the subsequent assembling step is also-lowered. In the thinning step, the dielectric material is polished by a diamond particle grinder and the surface is finally finished by wet etching. A solution including $H_2SO_4$, $H_2O_2$ and $H_2O$ at proportions of 1:1:10 may be used in the wet etching.

Since the high low noise performance is required for the RF amplifier 11, it is desirable to thin the dielectric material to approximately 100 μm to improve the performance, because, as described above, the loss in the via holes is reduced and the variations of the shapes and dimensions of the via holes are reduced, and hence the variation of the performance of the IC is reduced.

Thus, a portion of the GaAs substrate 1 having the thickness of 150 μm is thinned to the thickness of approximately 100 μm by selective wet etching which uses a mask. More specifically, a portion corresponding to an area 20 which includes the RF amplifier 10 is thinned over the length 1*b*. Finally, the conductive layer 3 is formed on the rear surface of the GaAs substrate 1.

In the present embodiment, the down-converter of the frequency converter to which the partial thinning acts in the present invention is also applicable to the up-converter.

In the present embodiment, the rear surface of the substrate at the area in which the RF amplifier 11 is formed is thinned to attain the partial thinning. The object of the present invention may also be achieved when the portion of the rear surface of the substrate which corresponds to the via-hole areas or the strip conductor area is thinned.

In accordance with the structure of the present invention, the width of the strip conductor may be reduced and the chip size may be reduced. Further, the transmission loss of the via hole which connects the strip conductor and the conductive layers on the rear surface is reduced and the low noise property is improved.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

I claim:

1. A microwave device comprising:

a substrate made of a dielectric material and having a thickness from approximately 150 micro-meters to approximately 400 micro-meters, said substrate having a through hole passing therethrough;

a conductive layer formed on an entire back surface of said substrate; and a frequency conversion circuit formed on a front surface of said substrate, said frequency conversion circuit including a radio frequency amplifier and a microstrip line formed on said front surface of said substrate, a part of said frequency conversion circuit being electrically connected to said metal film through said through hole;

said substrate being partially thinned at a predetermined portion of said back surface, the thickness of said substrate at said thinned portion being approximately 100 micro-meters, said through hole being formed through said predetermined portion of said substrate.

2. A microwave device according to claim 1, wherein said radio frequency amplifier is a field effect transistor, and wherein a source terminal of said field effect transistor is electrically connected to said conductive layer through said through hole.

3. A microwave device according to claim 2, wherein a plurality of said field effect transistors are formed on said front surface of said substrate, and said plurality of transistors provide a multi-stage amplifier.

4. A microwave device comprising:

a substrate made of a dielectric material and having a thickness of from approximately 150 micro-meters to approximately 400 micro-meters;

a frequency conversion circuit formed on a front surface of said substrate, said frequency conversion circuit including a radio frequency amplifier and a microstrip line formed on said front surface of said substrate; and a conductive layer formed on an entire back surface of said substrate, said substrate being partially thinned at a predetermined portion of said back surface, the thickness of said substrate at said thinned portion being approximately 100 micro-meters, said radio frequency amplifier being formed at a predetermined position on said front surface of said substrate, said predetermined position on said front surface being in opposition to said partially thinned portion on said back surface of said substrate, through said substrate.

5. A microwave device comprising:

a substrate made of a dielectric material and having a thickness from approximately 150 micro-meters to approximately 400 micro-meters, a conductive layer formed on an entire back surface of said substrate; and a frequency conversion circuit formed on a front surface of said substrate, said frequency conversion circuit including a radio frequency amplifier and a microstrip line formed on said front surface of said substrate;

said substrate being partially thinned at a predetermined portion of said back surface, the thickness of said substrate at said thinned portion being approximately 100 micro-meters, said microstrip line being formed at a predetermined position on said front surface of said substrate, said predetermined position on said front surface being in opposition to said partially thinned portion on said back surface of said substrate, through said substrate.

* * * * *